(12) United States Patent
Feygenson et al.

(10) Patent No.: US 12,105,560 B2
(45) Date of Patent: Oct. 1, 2024

(54) MULTI-DIRECTIONAL EXTENSION APPARATUS AND METHOD

(71) Applicant: Samsung Electronics Co., Ltd., Gyeonggi-do (KR)

(72) Inventors: Oleg Feygenson, Gyeonggi-do (KR); Igor Ivanov, Gyeonggi-do (KR); Seonho Hwang, Gyeonggi-do (KR); Hyungsok Yeo, Gyeonggi-do (KR); Minwoo Yoo, Gyeonggi-do (KR); Changryong Heo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 377 days.

(21) Appl. No.: 17/702,905

(22) Filed: Mar. 24, 2022

(65) Prior Publication Data

US 2022/0214718 A1 Jul. 7, 2022

Related U.S. Application Data

(63) Continuation of application No. PCT/KR2021/017756, filed on Nov. 29, 2021.

(30) Foreign Application Priority Data

Nov. 30, 2020 (KR) .................. 10-2020-0165038
Apr. 27, 2021 (KR) .................. 10-2021-0054339

(51) Int. Cl.
*G06F 1/16* (2006.01)
(52) U.S. Cl.
CPC .......... *G06F 1/1652* (2013.01); *G06F 1/1624* (2013.01)
(58) Field of Classification Search
CPC .... G06F 1/1624; G06F 1/1652; G06F 1/1647; G06F 1/1649; H04M 1/0268; H04M 2250/16
See application file for complete search history.

(56) References Cited

U.S. PATENT DOCUMENTS 8,379,377 B2 * 2/2013 Walters ................. G06F 1/1641
361/679.04
9,398,125 B1 7/2016 Hall
(Continued)

FOREIGN PATENT DOCUMENTS

JP 2018-25636 A 2/2018
KR 10-2007-0017778 A 2/2007
(Continued)

OTHER PUBLICATIONS

Korean Search Report dated Nov. 30, 2020.
Written Opinion dated Nov. 30, 2020.
European Search Report dated Feb. 19, 2024.

*Primary Examiner* — James Wu
(74) *Attorney, Agent, or Firm* — Cha & Reiter, LLC

(57) ABSTRACT

Disclosed is an electronic apparatus. The electronic apparatus may include a first display with a first side surface disposed along a first direction and a second side surface disposed along a second direction perpendicular to the first direction, a flexible second display disposed behind the first display and including a main region, a first region extending from the main region toward the first side surface, and a second region extending from the main region toward the second side surface, a first roller configured to wind or unwind the first region and movable along the first direction, and a second roller configured to wind or unwind the second region and movable along the second direction. The first roller may move along the first direction based on a rolling operation of the second roller, and the second roller may move along the second direction based on a rolling operation of the first roller.

15 Claims, 12 Drawing Sheets

(56) References Cited

U.S. PATENT DOCUMENTS

| | | |
|---|---|---|
| 9,619,197 B2 * | 4/2017 | Bang .................... G06F 3/1446 |
| 9,746,884 B2 | 8/2017 | Lee et al. |
| 9,928,571 B2 | 3/2018 | Chi et al. |
| 10,069,771 B2 | 9/2018 | Lee et al. |
| 10,785,351 B2 | 9/2020 | Li |
| 11,212,927 B2 | 12/2021 | Zhu et al. |
| 2010/0304793 A1 | 12/2010 | Kim et al. |
| 2016/0239051 A1 | 8/2016 | Lee et al. |
| 2019/0197960 A1 | 6/2019 | Kim |
| 2019/0243423 A1 | 8/2019 | Delaporte |
| 2020/0212338 A1 | 7/2020 | Ha |
| 2021/0116959 A1 | 4/2021 | Heo et al. |

FOREIGN PATENT DOCUMENTS

| | | |
|---|---|---|
| KR | 10-2011-0100607 A | 9/2011 |
| KR | 101138379 B1 * | 4/2012 |
| KR | 10-2015-0106211 A | 9/2015 |
| KR | 10-2016-0079443 A | 7/2016 |
| KR | 10-2020-0007510 A | 1/2020 |
| KR | 10-2020-0014878 A | 2/2020 |

\* cited by examiner

FIG. 9
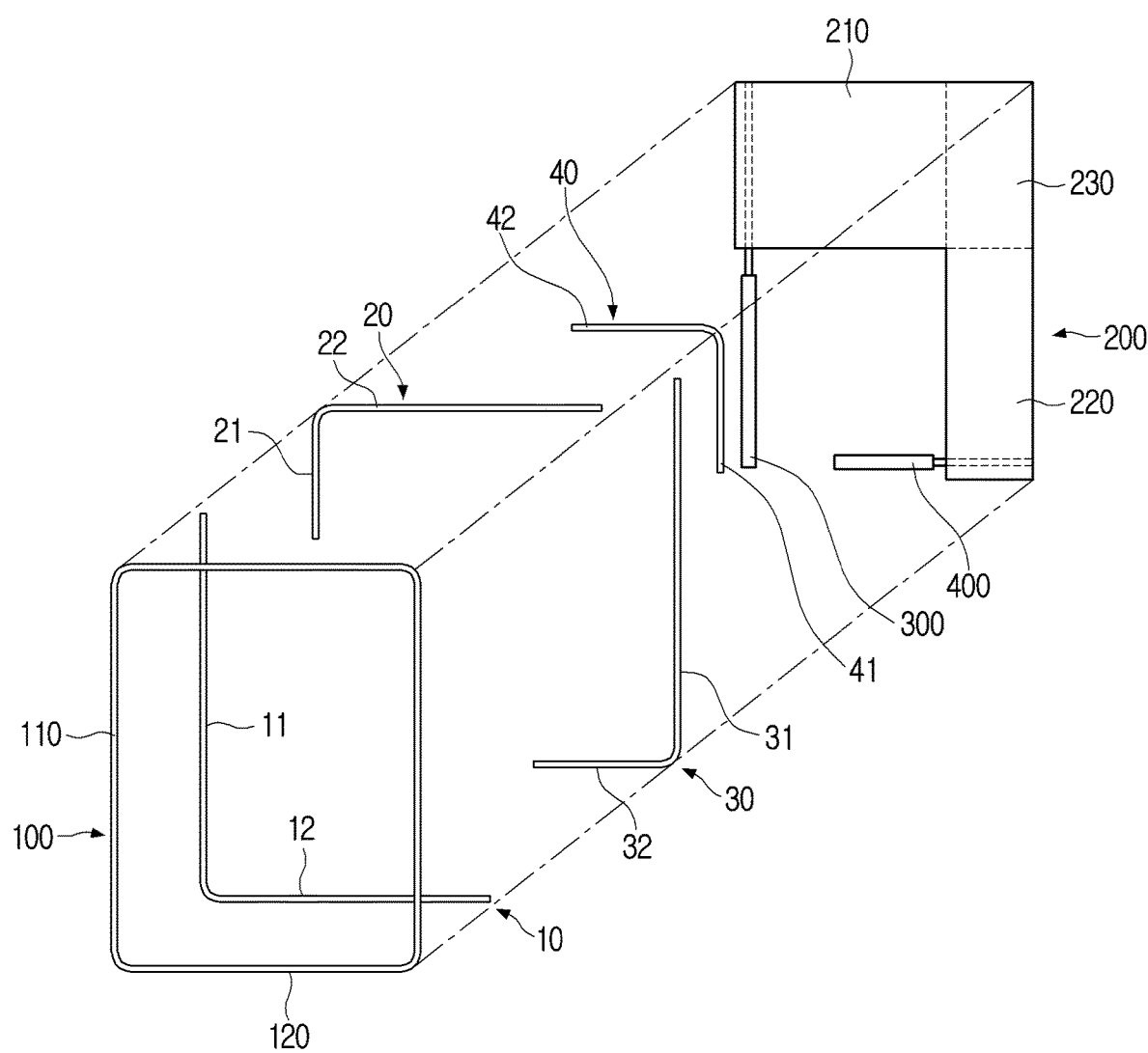
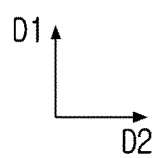

MULTI-DIRECTIONAL EXTENSION APPARATUS AND METHOD

CROSS-REFERENCE TO RELATED APPLICATIONS

This application is a bypass continuation of International Application No. PCT/KR2021/017756, filed on Nov. 29, 2021, which claims priority to Korean Patent Application No. 10-2020-0165038, filed on Nov. 30, 2020, in the Korean Intellectual Property Office, and to Korean Patent Application No. 10-2021-0054339, filed on Apr. 27, 2021, in the Korean Intellectual Property Office, the disclosures of which are herein incorporated by reference in their entirety.

BACKGROUND

1. Field

One or more embodiments of the instant disclosure generally relate to an electronic apparatus, and more specifically, an electronic apparatus with improved structure so that its display is extendible in multiple directions.

2. Description of Related Art

Electronic apparatuses such as TV, monitor, communication terminal, gaming machine, multimedia device, portable computer, image capturing device, or the like, have a display displaying image information. Traditional displays cannot be bent or folded, so the sizes of the electronic apparatuses including the displays depend on the sizes of the displays. Thus a problem existed in the art where the size of the electronic apparatus needed to increase as the screen area of the display is increased, since large displays are often desired by users.

Flexible displays that could be bent have been developed. As these flexible displays are folded, the bent area of the display may have a certain radius of curvature. Applying these flexible displays, an electronic apparatus may include a display that can be wrapped around a roller and the display may be released from the roller and unfolded as needed. However, there is a problem in that such a conventional rollable display may only be extended in one direction, but may not be extended in multiple directions.

SUMMARY

According to an embodiment, an electronic apparatus includes a first display comprising a first side surface disposed along a first direction and a second side surface disposed along a second direction perpendicular to the first direction; a flexible second display disposed behind of the first display and comprising a main region, a first region extending from the main region toward the first side surface, and a second region extending from the main region toward the second side surface; a first roller configured to wind or unwind the first region and movable along the first direction; and a second roller configured to wind or unwind the second region and movable along the second direction, and the first roller may move along the first direction based on a rolling operation of the second roller, and wherein the second roller may move along the second direction based on a rolling operation of the first roller.

The first roller may be disposed adjacent to the first side surface along the first direction, and the second roller may be disposed adjacent to the second side surface along the second direction.

The first roller may have a first rotating axis in parallel with the first direction, and the second roller may have a second rotating axis in parallel with the second direction.

The second display may have an "L" shape.

The electronic apparatus may further include a first driving device configured to move the first and second rollers linearly in the first and second directions; and a second driving device configured to rotate the first and second rollers.

The first driving device may include a first motor configured to move the first roller along the first direction and a second motor configured to move the second roller along the second direction, and the second driving device may include a third motor configured to rotate the first roller and a fourth motor configured to rotate the second roller.

The electronic apparatus may further include a sensor configured to sense a pulling direction of the second display; and a processor configured to control the first and second driving devices based on the pulling direction sensed by the sensor so that the second display is moved to a preset position.

The processor may control the first motor so that the first roller moves in the first direction, and control the fourth motor so that the second roller unwinds the second region in the first direction, when the pulling direction is the first direction.

The processor may control the second motor so that the second roller moves in the second direction, and control the third motor so that the first roller unwinds the first region in the second direction, when the pulling direction is the second direction.

The processor may control the first motor and the third motor so that the first roller unwinds the first region in the second direction while moving in the first direction, and control the second and fourth motors so that the second roller unwinds the second region in the first direction while moving in the second direction, when the pulling direction is a diagonal direction.

The electronic apparatus may further include a first frame supporting the first and second side surfaces of the first display; a second frame slidable in the first direction with respect to the first frame; a third frame slidable in the second direction with respect to the first frame; and a fourth frame slidable in the second direction with respect to the second frame and slidable in the first direction with respect to the third frame, and each of the first frame, the second frame, the third frame, and the fourth frame may have an "L" shape.

The first frame may include a first vertical area supporting the first side surface and a first horizontal area supporting the second side surface, the second frame may include a second vertical area slidable in the first direction with respect to the first vertical area and a second horizontal area disposed perpendicular to the second vertical area, the third frame may include a third horizontal area slidable in the second direction with respect to the first horizontal area and a third vertical area disposed perpendicular to the third horizontal area, and the fourth frame may include a fourth horizontal area slidable in the second direction with respect to the second horizontal area and a fourth vertical area slidable in the first direction with respect to the third vertical area.

The electronic apparatus may further include a first guide roller and a second guide roller disposed in parallel with the first and second rollers, respectively; and a first supporting member and a second supporting member of which one end is connected to one end of the first and second regions, respectively, and other end is wound around the first and second guide rollers, respectively.

A part of the first region may be disposed in parallel with the first display between the first roller and the first guide roller, and a part of the second region may be disposed in parallel with the first display between the second roller and the second guide roller.

The electronic apparatus may further include a first auxiliary roller, disposed in parallel with the first roller between the first roller and the first display, for guiding a moving path of the first region; and a second auxiliary roller, disposed in parallel with the second roller between the second roller and the first display, for guiding a moving path of the second region.

BRIEF DESCRIPTION OF THE DRAWINGS

FIG. 9 is an exploded perspective view of a plurality of frames according to one embodiment of the disclosure;

DETAILED DESCRIPTION

Figure 1:
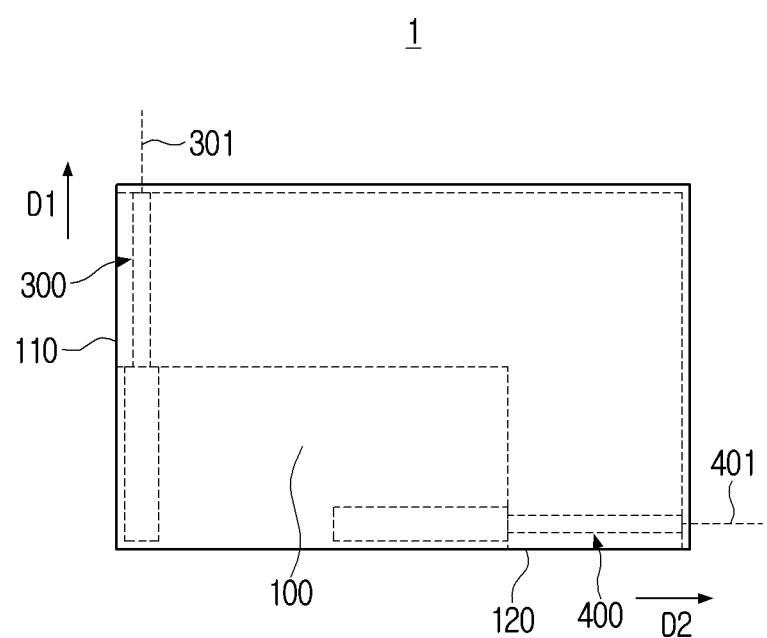
FIG. 1 is a plan view of an electronic apparatus according to one embodiment of the disclosure.

Examples described hereinafter are provided for comprehensive understanding of the disclosure, and it should be understood that various changes can be made to examples described herein and the disclosure can be embodied in different forms. In addition, in the following description, detailed descriptions of well-known functions or configurations may be omitted so as to not obscure the subject matter of the disclosure. In addition, it should be noted that the drawings are provided for comprehensive understanding of the disclosure, and are not illustrated as really scaled, and the dimensions of some elements may be exaggerated for clarity and convenience.

The terms used in the present specification and the claims are general terms identified in consideration of the functions of the various embodiments of the disclosure. However, these terms may vary depending on intention, technical interpretation, emergence of new technologies, and the like of those skilled in the related art. Some terms may be selected by an applicant arbitrarily, and the meaning thereof will be described in the detailed description. Unless there is a specific definition of a term, the term may be construed based on the overall contents and technological understanding of those skilled in the related art.

In this specification, the expressions "have," "may have," "include," or "may include" or the like represent presence of a corresponding feature (for example: components such as numbers, functions, operations, or parts) and does not exclude the presence of additional feature.

Since the components required for the description of each embodiment of the disclosure have been described herein, the embodiment is not limited thereto. Thus, some components may be modified or omitted and other components may be added. In addition, the components may be distributed and arranged in different independent devices.

Furthermore, although the embodiments of the disclosure will be described in detail with reference to the accompanying drawings and the contents set forth in the accompanying drawings, the disclosure is not limited to the embodiments.

An electronic apparatus in accordance with various embodiments of the disclosure may include at least one of, for example, smartphones, tablet personal computers (PCs), mobile phones, video telephones, electronic book readers, desktop PCs, laptop PCs, netbook computers, workstations, servers, a personal digital assistance (PDA), a portable multimedia player (PMP), an MP3 player, a medical device, a camera, or a wearable device. According to various embodiments, the wearable device may include any one or any combination of the accessory type (e.g., as a watch, a ring, a bracelet, an ankle bracelet, a necklace, a pair of glasses, or a head-mounted-device (HMD)); a fabric or a garment-embedded type (e.g., an electronic clothing), a skin-attached type (e.g., a skin pad or a tattoo); or a bio-implantable circuit.

In some embodiments, the electronic apparatus may be a home appliance. In some embodiments, the home appliance may include at least one of, for example, a television, a digital video disk (DVD) player, an audio system, a refrigerator, air-conditioner, a cleaner, an oven, a microwave, a washing machine, an air purifier, a set top box, a home automation control panel, a security control panel, a TV box (e.g., SAMSUNG HOMESYNC, APPLE TV, or GOOGLE TV), a game console (e.g., XBOX, PLAYSTATION), an electronic dictionary, an electronic key, a camcorder, or an electronic frame.

In other embodiments, the electronic apparatus may include at least one of a variety of medical devices (e.g., various portable medical measurement devices such as a blood glucose meter, a heart rate meter, a blood pressure meter, or a temperature measuring device), magnetic resonance angiography (MRA), magnetic resonance imaging (MRI), computed tomography (CT), or ultrasonic wave device, etc.), a navigation system, a global navigation satellite system (GNSS), an event data recorder (EDR), a flight data recorder (FDR), an automotive infotainment devices, a marine electronic equipment (e.g., marine navigation devices, gyro compasses, etc.), avionics, a security device, a car head unit, industrial or domestic robots, a drone, an automated teller machine (ATM), a point of sale (POS) of a store, or an Internet of Things (IoT) device (e.g., light bulbs, sensors, sprinkler devices, fire alarms, thermostats, street lights, toasters, exercise equipment, hot water tanks, heater, boiler, etc.).

According to an embodiment, the electronic apparatus may be implemented as a part of building/structure, an electronic board, an electronic signature receiving device, a projector, or various measuring devices (e.g., water, electricity, gas, or electromagnetic wave measuring devices, or the like), or the like. In various embodiments, the electronic apparatus may be one or more of the various devices described above or combination of the devices. The electronic apparatus according to an embodiment may be a flexible electronic apparatus. The electronic apparatus is not limited to the devices described above, and may include a new electronic apparatus according to technology development.

Hereinafter, the disclosure will be described in greater detail with reference to the attached drawings.

Figure 2:
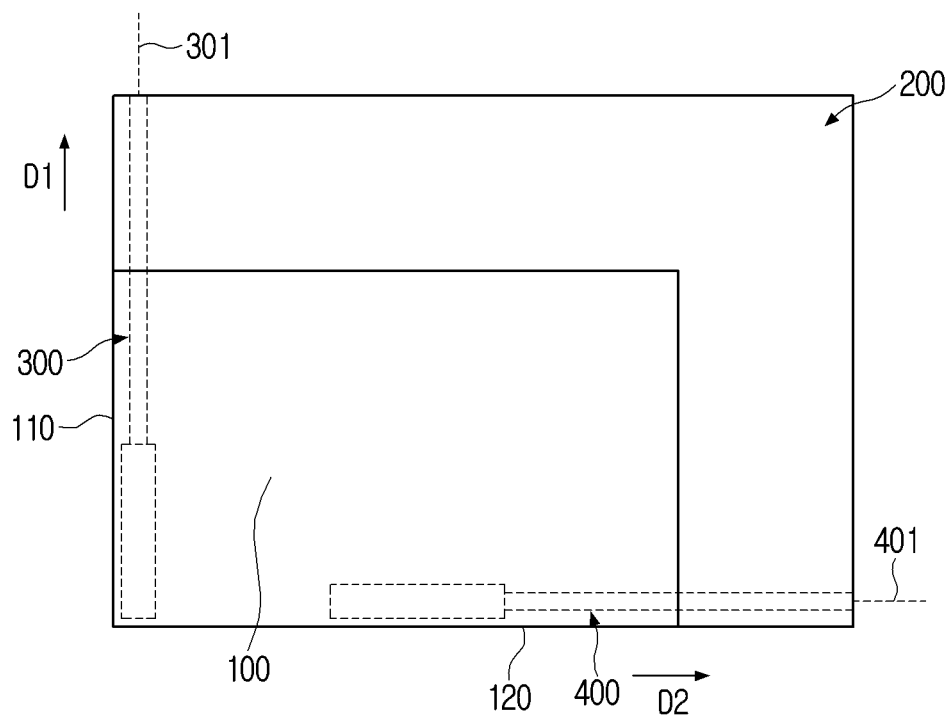
FIG. 2 is a plan view illustrating a state in which the second display is extended in the electronic apparatus of FIG. 1.

FIG. 1 is a plan view of an electronic apparatus according to one embodiment of the disclosure. FIG. 2 is a plan view illustrating a state in which the second display is extended in the electronic apparatus of FIG. 1. and FIG. 3 is a plan view illustrating a second display wound around first and second rollers.

Figure 3:
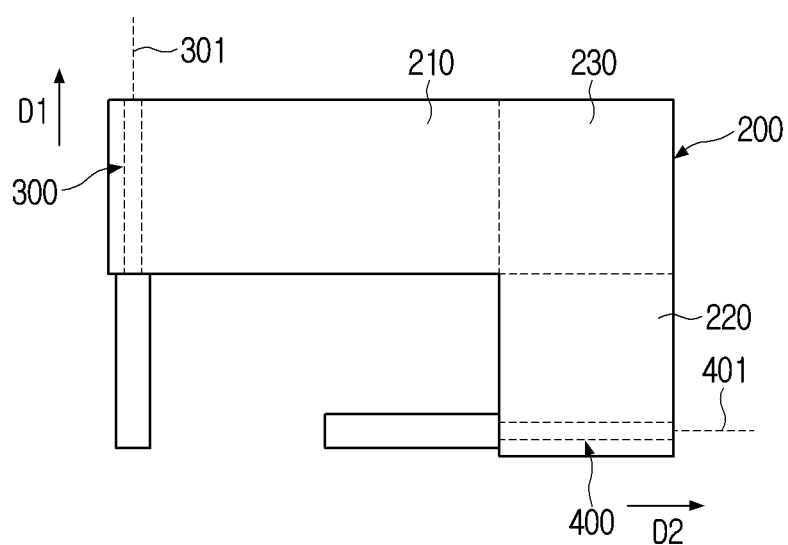
FIG. 3 is a plan view illustrating a second display wound around first and second rollers.

Referring to FIGS. 1 to 3, an electronic apparatus 1 according to an embodiment may include a first display 100, a second display 200, a first roller 300, and a second roller 400.

The first and second displays 100 and 200 may display various information (e.g., multimedia data or text data, etc.) to the user. The first and second displays 100 and 200 may include, for example, liquid crystal display (LCD), light-emitting diode (LED) display, organic light-emitting diode (OLED) display, microelectromechanical systems (MEMS) display, electronic paper display, or flexible display that can be bent or curved.

The first and second displays 100 and 200 may also display various content (e.g., text, images, video, icons, or symbols, etc.) to the user, for example. The first and second displays 100 and 200 may include a touch screen, and may receive, for example, a touch, gesture, proximity, or hovering input using a portion of the user's body.

The first display 100 may be a rigid display which is not flexible and the second display 200 may be a flexible display which is flexible, so that it can be folded or rolled.

The second display 200 may be disposed behind the first display 100. The second display 200 may be covered by the first display 100 and then may be exposed beyond the first display 100 by moving to the outside of the first display 100 according to user operation. Accordingly, the entire display area defined by the first and second displays 100 and 200 may be extended.

The first display 100 may include a first side 110 disposed along with the first direction D1 and a second side 120 disposed along with the second direction D2 perpendicular to the first direction D1.

The first display 100 may have an approximately rectangular shape. The first side 110 may be a left side of the first display 100, and the second side 120 may be a lower side of the first display 100.

The second display 200 may be disposed behind the first display 100, and may include a main region 230, a first region 210 extending from the main region 230 toward the first side 110, and a second region 220 extending from the main region 230 toward the second side 120.

The first region 210, the second region 220, and the main region 230 may each have an approximately rectangular shape, and all may have the same thickness, and may be integrally formed. The first region 210 may protrude from the left side of the main region 230 toward the first side 110 of the first display 100. The second region 220 may protrude from a lower side of the main region 230 toward the second side 120 of the first display 100.

As shown in FIG. 3, the second display 200 may have an overall "L" shape.

The first roller 300 may move along the first direction D1 to wind or unwind the first region 210. The second roller 400 may wind or unwind the second region 220, and may move along the second direction D2.

The first and second rollers 300 and 400 may be disposed in a rear side of the first display 100 and be disposed perpendicular with each other.

The first roller 300 may be arranged adjacent to the first side 110 along the first direction D1, and the second roller 400 may be arranged adjacent to the second side 120 along the second direction D2.

The first roller 300 may have a first rotating axis 301 in line with the first direction D1, and the second roller 400 may have a second rotating axis 401 in line with the second direction D2.

The first roller 300 may rotate along the first rotating axis 301 to move the first region 210 along the second direction D2. The second roller 400 may rotate along the second rotating axis 401 to move the second region 220 along the first direction D1.

The first roller 300 may move along the first direction D1 in association with the rolling operation of the second roller 400. The second roller 400 may move along the second direction D2 in association with the rolling operation of the first roller 300.

The second display 200 may move along the first direction D1 and/or the second direction D2 so that the entire display area defined by the first and second displays 100 and 200 may be extended in multiple directions.

The second display 200 may move along a diagonal direction, which is the vector sum of the first direction D1 and the second direction D2, so that the entire display area defined by the first and second displays 100 and 200 may be extended in the diagonal direction.

Figure 4:
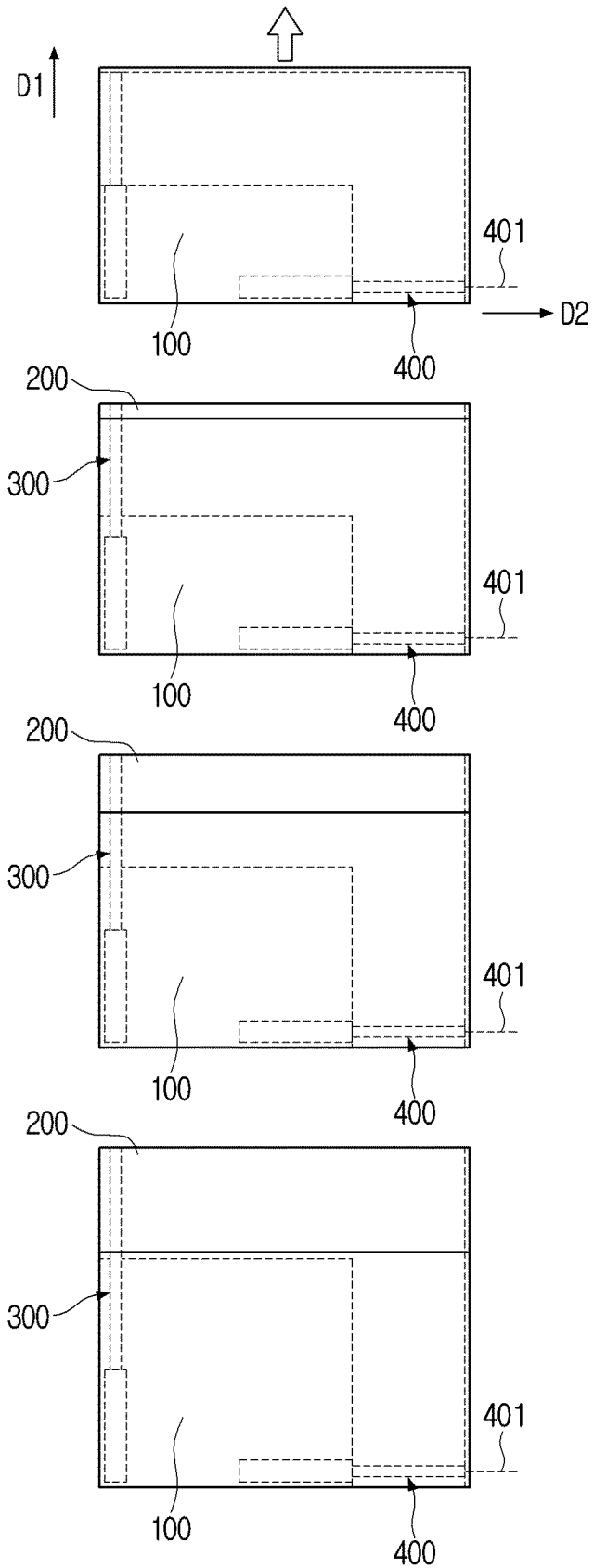
FIG. 4 are views illustrating the operation in which the second display extends along the first direction.
Figure 5:
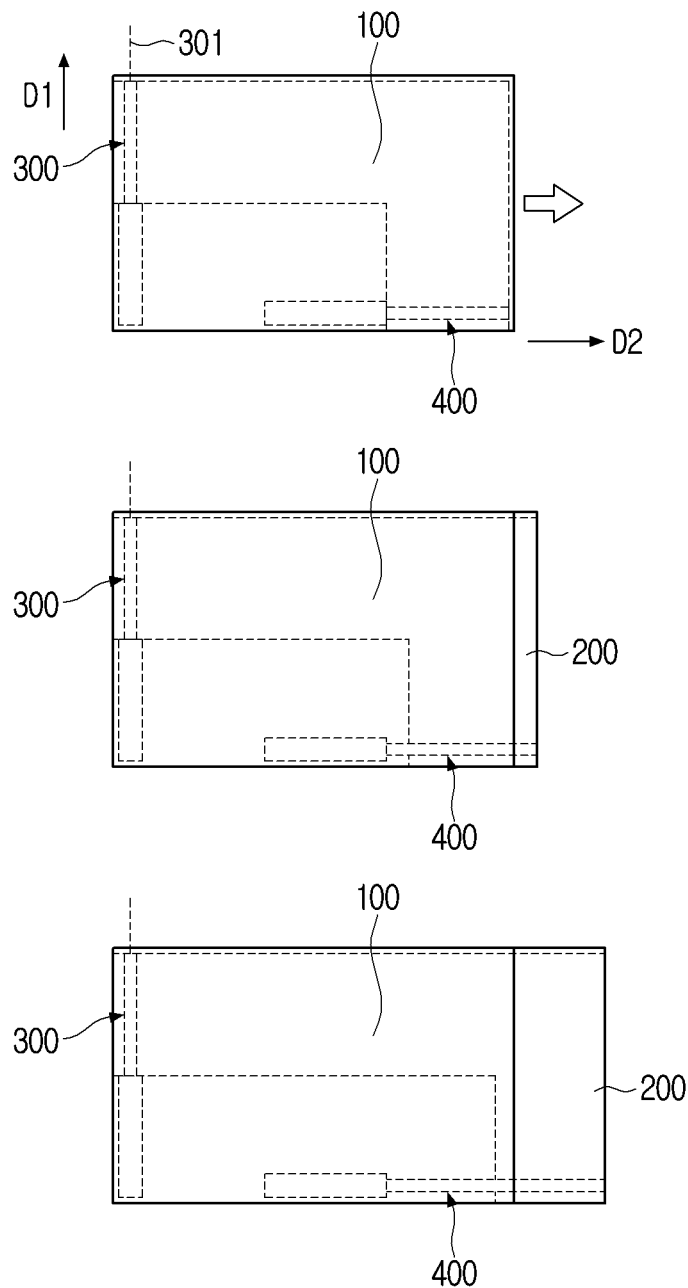
FIG. 5 are views illustrating the operation in which the second display extends along the second direction.
Figure 6:
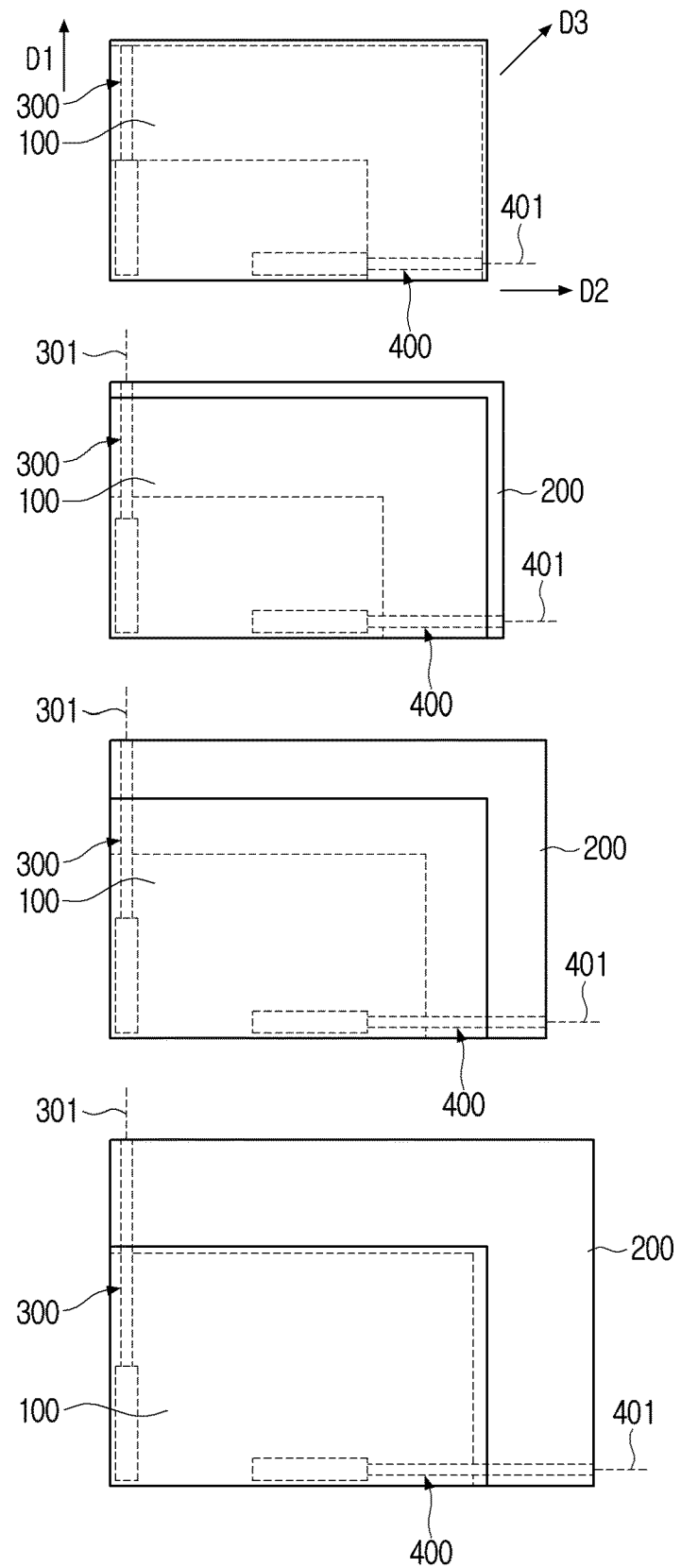
FIG. 6 are views illustrating the operation of the second display extending along a diagonal direction.

FIG. 4 are views illustrating the operation in which the second display extends along the first direction. FIG. 5 are views illustrating the operation in which the second display extends along the second direction. And FIG. 6 are views illustrating the operation of the second display extending along a diagonal direction.

Referring to FIG. 4, when the user pulls the second display 200 in the first direction D1, the first roller 300 may move or extent in the first direction D1, and the second roller 400 may rotate with respect to the second rotating axis 401 so that the second region 220 of the second display 200 may be unwound.

The second display 200 may move along the first direction D1, and may be exposed beyond the first display 100. The display area defined by the first and second displays 100 and 200 may be longer in the vertical direction, as compared to the first display 100 alone.

Referring to FIG. 5, when the user pulls the second display 200 in the second direction D2, the second roller 400 may move or extend in the second direction D2, and the first roller 300 may rotate around the first rotating axis 301 so that the first region 210 of the second display 200 that has been wound is unwound.

The second display 200 may be exposed beyond the first display 100 by moving along the second direction D2. The display area defined by the first and second displays 100 and 200 may be longer in the horizontal direction, as compared to the first display 100 alone.

Referring to FIG. 6, if the user pulls the second display 200 in the third direction D3, which is the diagonal direction of the first display 100, the first roller 300 may rotate about the first rotating axis 301 so that the first region 210 of the second display 200 is unwound while moving or extending in the first direction D1, and the second roller 400 may rotate about the second rotating axis 401 so that the second region 220 of the second display 200 is unwound while moving or extending in the second direction D2.

Accordingly, the second display 200 may be exposed beyond the first display 100 by moving along the third direction D3, which is the vector sum of the first and second directions D1 and D2. The display area defined by the first and second displays 100 and 200 may be extended diagonally.

As such, the electronic apparatus 1 according to one embodiment of this disclosure may extend the display area diagonally, as well as horizontally and vertically.

The electronic apparatus 1 according to one embodiment of this disclosure may have its display area extended passively by the pulling force of the user as described above, but the embodiments disclosed herein are not limited thereto, and the display area may be actively or automatically extended by the driving device of a motor, for example. The automatic extension mechanism will be described in detail with reference to FIG. 7.

Figure 7:
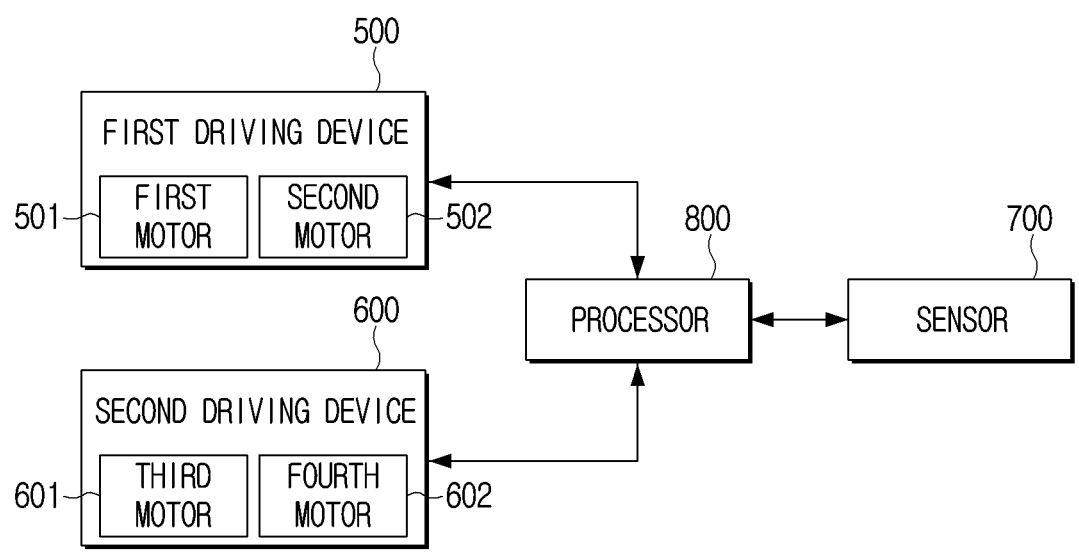
FIG. 7 is a block diagram illustrating an electronic apparatus according to one embodiment of the disclosure.
Figure 8:
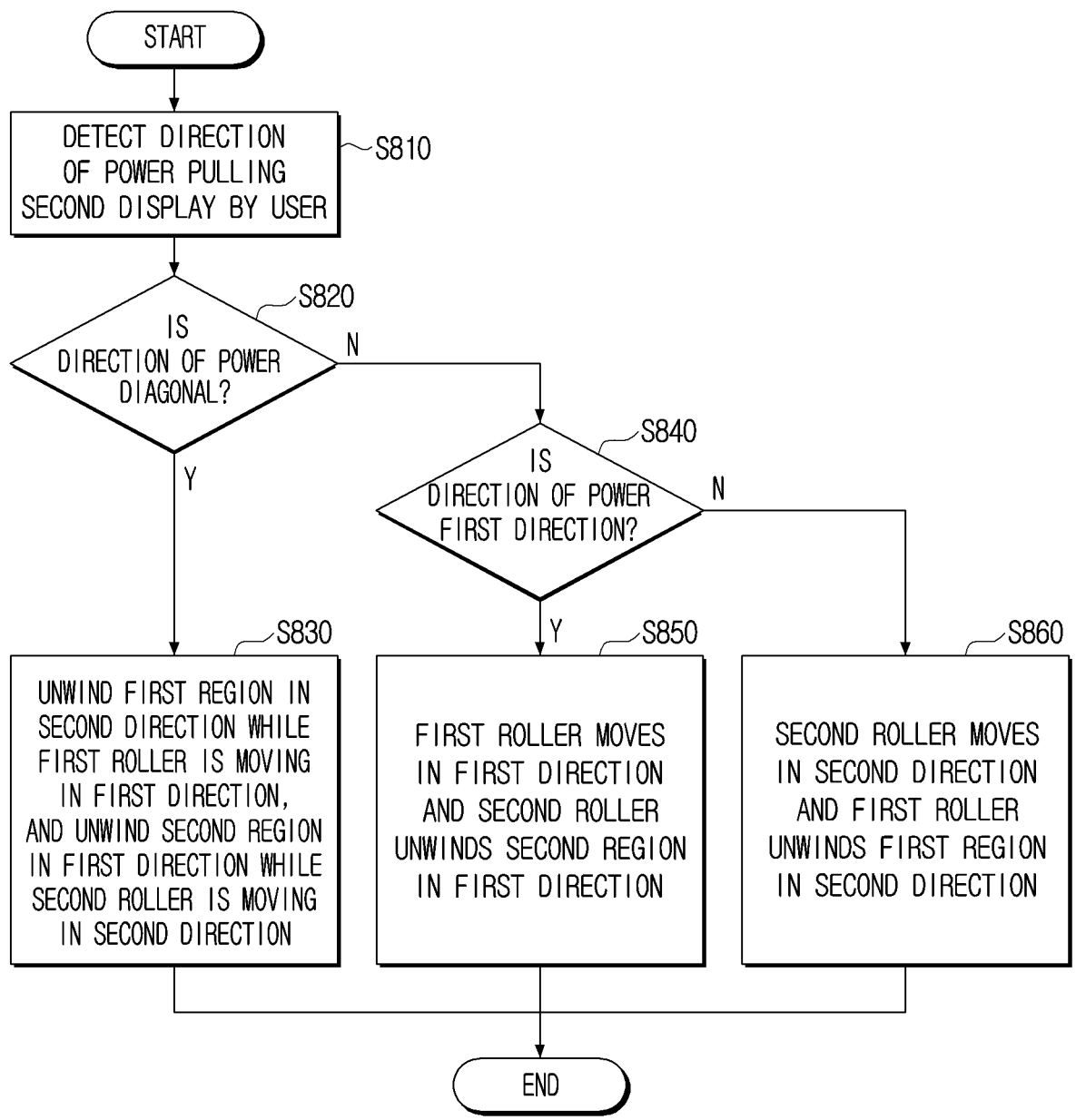
FIG. 8 is a flowchart illustrating a control process of the electronic apparatus according to one embodiment of the disclosure.

FIG. 7 is a block diagram illustrating an electronic apparatus according to one embodiment of the disclosure. FIG. 8 is a flowchart illustrating a control process of the electronic apparatus according to one embodiment of the disclosure.

Referring to FIGS. 7 and 8, the electronic apparatus according to one embodiment of the disclosure may further include a first driving device 500, a second driving device 600, a sensor 700 and a processor 800.

The first driving device 500 may linearly move the first and second rollers 300 and 400 in first and second directions (D1 and D2), respectively.

The first driving device 500 may include a first motor 501 moving the first roller 300 along the first direction D1 and a second motor 502 moving the second roller 400 along the second direction D2.

The second driving device 600 may rotate the first and second rollers 300 and 400. The second driving device 600 may include a third motor 601 for rotating the first roller 300 and a fourth motor 602 for rotating the second roller 400.

The sensor 700 may detect the direction of the force of the user pulling the second display 200. The sensor 700 may be placed on the second display 200, but the position of the sensor 700 is not limited thereto. For example, the sensor 700 may be placed in at least one of the second to fourth frames 20, 30, 40 to be described later.

The processor 800 may control the first and second driving devices 500, 600 so that the second display 200 moves to a preset position, based on the direction of force detected by the sensor 700. The processor 800 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. In addition, an artisan understands and appreciates that a "processor" or "microprocessor" may be hardware in the claimed disclosure.

The processor 800 may control the first and third motors 501 and 601 so as to unwind the first region 210 in the second direction D2 while the first roller 300 moves in the first direction D1, if the direction of the force sensed by the sensor 700 is the diagonal direction of the first display 100, and may control the second and fourth motors 502 and 602 so as to unwind the second region in the first direction D1 while the second roller 400 moves in the second direction D2.

The first roller 300 may move or extent in the first direction D1 by the first motor 501 and rotate to unwind the first region 210 in the second direction D2 by the third motor 601. At the same time, the second roller 400 may rotate to unwind the second region 220 in the first direction D1 by the fourth motor 602 while moving in the second direction D2 by the second motor 502.

The speed of movement of the first roller 300 in the first direction D1 by the first motor 501 may be the same as the linear speed in the first direction D1 of the second region 220 by the fourth motor 602. The speed of movement of the second roller 400 in the second direction D2 by the second motor 502 may be the same as the linear speed in the second direction D2 of the first region 210 by the third motor 601.

The linear movement and rotation of the first and second rollers 300 and 400 are interlocked with each other, so that the second display 200 may be stably extended in the diagonal direction.

The processor 800 may control the first motor 501 to move the first roller 300 in the first direction D1 when the direction of the force sensed by the sensor 700 is not a diagonal direction but the first direction D1, and control the fourth motor 602 such that the second roller 400 unwinds the second region 220 in the first direction D1.

The first roller 300 may move in the first direction D1 by the first motor 501, and the second roller 400 may rotate to unwind the second region 220 in the first direction D1 by the fourth motor 602.

The speed of movement of the first roller 300 in the first direction D1 by the first motor 501 may be the same as the linear speed in the first direction D1 of the second region 220 by the fourth motor 602. The linear movement of the first roller 300 and the rotation of the second roller 400 are interlocked with each other, so that the second display 200 may be stably extended in the first direction D1.

The processor 800 may control the second motor 502 to move the second roller 400 in the second direction D2 when the direction of the force sensed by the sensor 700 is not the diagonal direction but the second direction D2, and may control the third motor 601 so that the first roller 300 unwinds the first region 210 in the second direction D2.

The second roller 400 may move in the second direction D2 by the second motor 502, and at the same time the first roller 300 may rotate to unwind the first region 210 by the third motor 601 in the second direction D2.

The moving speed of the second roller 400 in the second direction D2 by the second motor 502 may be the same as the linear speed of the second roller 400 in the second direction D2 of the first region 210 by the third motor 601. The linear movement of the second roller 400 and the rotation of the first roller 300 may be interlocked with each other, so that the second display 200 may be stably extended in the second direction D2.

As shown in FIG. 8, in operation S810, the electronic apparatus may detect the direction in which the second display 200 is being pulled by the user. In operation S820, a determination is made as to whether the direction is diagonal. If so, in operation S830, the first roller 300 may move or extent in the first direction D1 by the first motor 501 and rotate to unwind the first region 210 in the second direction D2 by the third motor 601. At the same time, the second roller 400 may rotate to unwind the second region 220 in the first direction D1 by the fourth motor 602 while moving in the second direction D2 by the second motor 502. If the direction is not diagonal in operation S820, then in operation S840 a determination is made as to whether the pulling direction is the first direction D1. If so, in operation S850 the processor 800 may control the first motor 501 to move the first roller 300 in the first direction D1 and control the fourth motor 602 such that the second roller 400 unwinds the second region 220 in the first direction D1. If not, in operation S860 the processor 800 may control the second motor 502 to move the second roller 400 in the second direction D2, and may control the third motor 601 so that the first roller 300 unwinds the first region 210 in the second direction D2.

Figure 10:
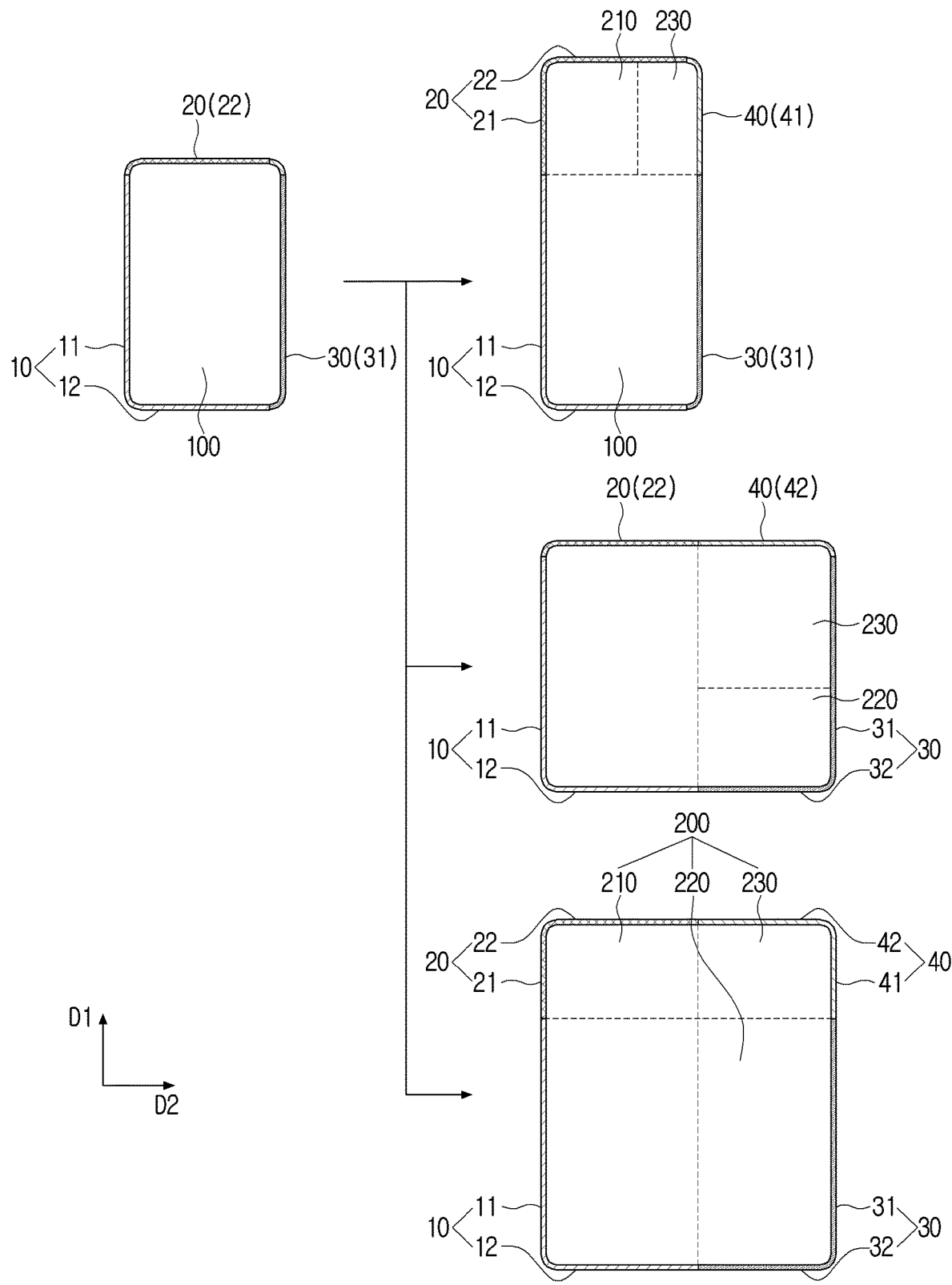
FIG. 10 is a view illustrating the placement of a plurality of frames according to the extension direction of the second display.

FIG. 9 is an exploded perspective view of a plurality of frames according to one embodiment of the disclosure. FIG. 10 is a view illustrating the placement of a plurality of frames according to the extension direction of the second display.

Referring to FIGS. 9 and 10, the electronic apparatus according to an embodiment of the disclosure may further include a first frame 10, a second frame 20, a third frame 30, and a fourth frame 40. The first to fourth frames 10, 20, 30, and 40 may each have an "L" shape. The first to fourth frames 10, 20, 30, and 40 may each be a rigid body.

The first frame 10 may support the first and second sides 110 and 120 of the first display 100. The first frame 10 may surround the first and second sides 110 and 120 of the first display 100 and may be integrally formed with the first display 100.

The first frame 10 may include a first vertical area 11 supporting the first side 110 and a first horizontal area 12 supporting the second side 120.

The first vertical area 11 may be disposed in parallel with the first direction D1, and the first horizontal area 12 may be disposed in parallel with the second direction D2. The first vertical area 11 may have a length corresponding to the first side surface 110, and the first horizontal area 12 may have a length corresponding to the second side surface 120.

The second frame 20 may slide in the first direction D1 with respect to the first frame 10. The second frame 20 may include a second vertical area 21 slidable in the first direction D1 with respect to the first vertical area 11, and a second horizontal area 22 disposed perpendicular to the second vertical area 21. The second vertical area 21 may cover the left side of the second display 200, and the second horizontal area 22 may cover the upper surface of the second display 200.

The upper end of the first roller 300 may be rotatably connected to the second horizontal area 22. Accordingly, when the second display 200 extends in the first direction D1, the first roller 300 and the second horizontal area 22 may move together in the first direction D1.

The second vertical area 21 may be disposed in parallel with the first direction D1, and the second horizontal area 22 may be disposed in parallel with the second direction D2. The second vertical area 21 may be overlapped with the first vertical area 11 and may be moved in the first direction D1 with respect to the first vertical area 11. The second horizontal area 22 may have a length corresponding to the first horizontal area 12.

The third frame 30 may slide in the second direction D2 with respect to the first frame 10. The third frame 30 may include a third horizontal area 32 that can slide in the second direction D2 with respect to the first horizontal area 12, and a third vertical area 31 disposed perpendicular to the third horizontal area 32. The third vertical area 31 may cover the right side of the second display 200, and the third horizontal area 32 may cover the lower side of the second display 200.

The right end of the second roller 400 may be rotatably connected to the third vertical area 31. Accordingly, when the second display 200 extends in the second direction D2, the second roller 400 and the third vertical area 31 may move together in the second direction D2.

The third vertical area 31 may be disposed in parallel with the first direction D1, and the third horizontal area 32 may be disposed in parallel with the second direction D2. The third horizontal area 32 may overlap the first horizontal area 12 and movement in the first direction D1 may be restricted by the first horizontal area 12. The third vertical area 31 may have a length corresponding to the first vertical area 11.

The fourth frame 40 may slide in the second direction D2 with respect to the second frame 20, and may slid in the first direction D1 with respect to the third frame 30.

The fourth frame 40 may include a fourth horizontal area 42 slidable in the second direction D2 with respect to the second horizontal area 22 and a fourth vertical area 41 slidable in the first direction D1 with respect to the third vertical area 31. The fourth vertical area 41 may cover the right side of the second display 200, and the fourth horizontal area 42 may cover the upper side of the second display 200.

The fourth vertical area 41 may be disposed in parallel with the first direction D1, and the fourth horizontal area 42 may be disposed in parallel with the second direction D2. The fourth horizontal area 42 may be partially overlapped with the second horizontal area 22 and movement in the first direction D1 may be restricted by the second horizontal area 22. The fourth vertical area 41 may be partially overlapped with the third vertical area 31 and movement in the second direction D2 may be restricted by the third vertical area 31.

When the second display is extended in the first direction D1, the second frame 20 may slide in the first direction D1 with respect to the first frame 10, and the fourth frame 40 may slide in the first direction D1 with respect to the third frame 30.

When the second display is extended in the first direction D1, the second vertical area 21 may slide in the first direction D1 with respect to the first vertical area 11, and the fourth vertical area 41 may slide in the first direction D1 with respect to the third vertical area 31.

When the second display is extended in the second direction D2, the third frame 30 may slide in the second direction D2 with respect to the first frame 10, and the fourth frame 40 may slide in the second direction D2 with respect to the second frame 20.

When the second display is extended in the second direction D2, the third horizontal area 32 may slide in the second direction D2 with respect to the first horizontal area 12, and the fourth horizontal area 42 may slide in the second direction D2 with respect to the second horizontal area 22.

When the second display is extended in the third direction D3, the second frame 20 may slide in the first direction D1 with respect to the first frame 10, and the third frame 30 may slide in the second direction D2 with respect to the first frame 10. At the same time, the fourth frame 40 may slide in the first direction D1 with respect to the third frame 30 and slid in the second direction D2 with respect to the second frame 20.

When the second display is extended in the first direction D1, the second vertical area 21 may slide in the first direction D1 with respect to the first vertical area 11, and the fourth vertical area 41 overlapping the second horizontal area 22 may slide in the first direction D1 with respect to the third vertical area 31.

Since the second display 200 is extended in any one of the first to third directions D1, D2, and D3, and at the same time, the first to fourth frames 10, 20, 30, and 40 are extended in association with the above-described process, the side surfaces of the second display 200 may be stably covered by the first to fourth frames 10, 20, 30, and 40 to be protected from the outside.

Figure 11:
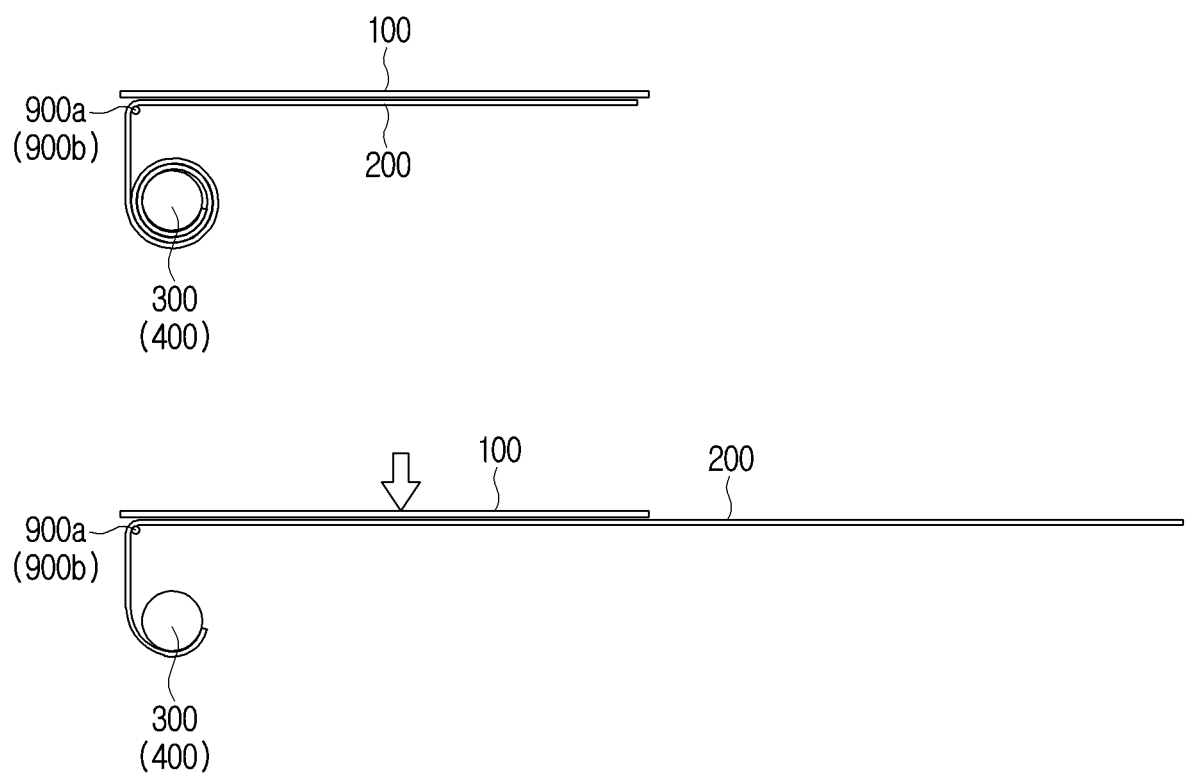
FIG. 11 is a side view illustrating the process by which the auxiliary roller guides the direction of movement of the second display.
Figure 12:
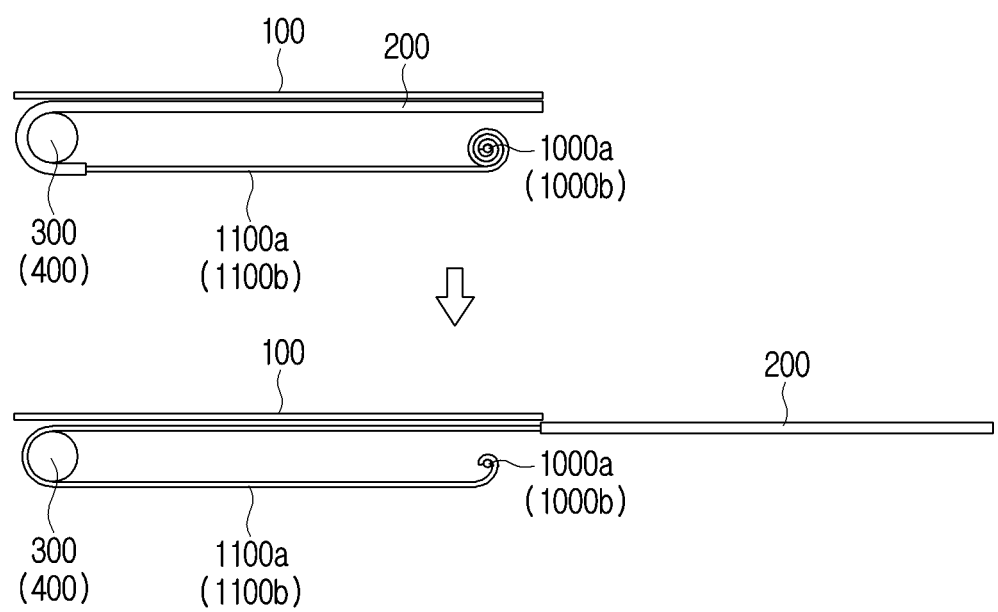
FIG. 12 is a side view illustrating the process by which the second display extends in a state where one end of the second display is connected to a support member wounded around a guide roller.

FIG. 11 is a side view illustrating the process by which the auxiliary roller guides the direction of movement of the second display. And FIG. 12 is a side view illustrating the process by which the second display extends in a state where one end of the second display is connected to a support member wounded around a guide roller.

Referring to FIG. 11, the electronic apparatus according to an embodiment of the disclosure may include a first auxiliary roller 900a and a second auxiliary roller 900b. The first auxiliary roller 900a may be disposed in line with the first roller 300 between the first roller 300 and the first display 100. The second auxiliary roller 900b may be disposed in line with the second roller 400 between the second roller 400 and the first display 100. The first and second auxiliary rollers 900a and 900b may be disposed adjacent to the rear surface of the first display 100.

The first auxiliary roller 900a may guide the moving path of the first region 210 of the second display 200, and the second auxiliary roller 900b may guide the moving path of the second region 220 of the second display 200.

The first region 210 may be unwound from the first roller 300 while being in contact with the outer surface of the first auxiliary roller 900a to move in a direction parallel to the first display 100. Similarly, the second region 220 may be unwound from the second roller 400 while being in contact with the outer surface of the second auxiliary roller 900b to move in a direction parallel to the first display 100.

Accordingly, the second display 200 may be guided to move in a direction parallel to the first display 100 by the first and second auxiliary rollers 900a and 900b, regardless of the amount of winding around the first and second rollers 300 and 400.

Referring to FIG. 12, the electronic apparatus according to an embodiment may further include a first guide roller 1000a and a second guide roller 1000b disposed in parallel with the first and second rollers 300 and 400, respectively. The electronic apparatus according to an embodiment may also include a first supporting member 1100a and a second supporting member 1100b of which one end is connected to one end of the first and second regions 210 and 220, respectively, and other end is wound around the first and second guide rollers 1000a and 1000b, respectively.

The first and second support members 1100a and 1100b may have the same width as the first and second regions 210 and 220, respectively. The first and second support members 1100a and 1100b may be made of fabric or plastic, but the material is not limited thereto.

A part of the first region 210 may be disposed in parallel with the first display 100 between the first roller 300 and the first guide roller 1000a, and a part of the second region 220 is disposed in parallel with the first display 100 between the second roller 400 and the second guide roller 1000b.

Not all of the first and second regions 210 and 220 of the second display 200 are wound around the first and second rollers 300 and 400, and only a very small area of the second display 200 is wound around the first and second rollers 300 and 400 and bent, so that the second display 200 may not be damaged due to excessive bending stress while expanding and contracting, and may stably move.

While the preferred embodiment of this disclosure has been shown and described, the disclosure is not limited to the specific embodiment described above, and it is apparent that various modifications can be made by those having ordinary skill in the technical field to which the disclosure belongs, without departing from the gist of the disclosure as claimed by the appended claims, and such modifications shall be within the scope of the claims range.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. An electronic apparatus comprising:
   a first display comprising a first side surface disposed along a first direction and a second side surface disposed along a second direction perpendicular to the first direction;
   a flexible second display disposed behind the first display and comprising a main region, a first region extending from the main region toward the first side surface, and a second region extending from the main region toward the second side surface;
   a first roller configured to wind or unwind the first region and movable along the first direction; and
   a second roller configured to wind or unwind the second region and movable along the second direction,
   wherein the first roller moves along the first direction based on a rolling operation of the second roller, and
   wherein the second roller moves along the second direction based on a rolling operation of the first roller.

2. The electronic apparatus of claim 1, wherein the first roller is disposed adjacent to the first side surface along the first direction, and
   wherein the second roller is disposed adjacent to the second side surface along the second direction.

3. The electronic apparatus of claim 1, wherein the first roller has a first rotating axis in parallel with the first direction, and
   wherein the second roller has a second rotating axis in parallel with the second direction.

4. The electronic apparatus of claim 1, wherein the second display has an "L" shape.

5. The electronic apparatus of claim 1, further comprising:
a first driving device configured to move the first and second rollers linearly in the first and second directions; and
a second driving device configured to rotate the first and second rollers.

6. The electronic apparatus of claim 5, wherein the first driving device comprises a first motor configured to move the first roller along the first direction and a second motor configured to move the second roller along the second direction, and
wherein the second driving device comprises a third motor configured to rotate the first roller and a fourth motor configured to rotate the second roller.

7. The electronic apparatus of claim 6, further comprising:
a sensor configured to sense a pulling direction of the second display; and
a processor configured to control the first and second driving devices based on the pulling direction sensed by the sensor so that the second display is moved to a preset position.

8. The electronic apparatus of claim 7, wherein the processor is further configured to control the first motor so that the first roller moves in the first direction, and control the fourth motor so that the second roller unwinds the second region in the first direction, when the pulling direction is the first direction.

9. The electronic apparatus of claim 7, wherein the processor is further configured to control the second motor so that the second roller moves in the second direction, and control the third motor so that the first roller unwinds the first region in the second direction, when the pulling direction is the second direction.

10. The electronic apparatus of claim 7, wherein the processor is further configured to control the first motor and the third motor so that the first roller unwinds the first region in the second direction while moving in the first direction, and control the second and fourth motors so that the second roller unwinds the second region in the first direction while moving in the second direction, when the pulling direction is a diagonal direction.

11. The electronic apparatus of claim 1, further comprising:
a first frame supporting the first side surface and the second side surface of the first display;
a second frame slidable in the first direction with respect to the first frame;
a third frame slidable in the second direction with respect to the first frame; and
a fourth frame slidable in the second direction with respect to the second frame and slidable in the first direction with respect to the third frame,
wherein each of the first frame, the second frame, the third frame, and the fourth frame has an "L" shape.

12. The electronic apparatus of claim 11,
wherein the first frame comprises a first vertical area supporting the first side surface and a first horizontal area supporting the second side surface,
wherein the second frame comprises a second vertical area slidable in the first direction with respect to the first vertical area and a second horizontal area disposed perpendicular to the second vertical area,
wherein the third frame comprises a third horizontal area slidable in the second direction with respect to the first horizontal area and a third vertical area disposed perpendicular to the third horizontal area, and
wherein the fourth frame comprises a fourth horizontal area slidable in the second direction with respect to the second horizontal area and a fourth vertical area slidable in the first direction with respect to the third vertical area.

13. The electronic apparatus of claim 1, further comprising:
a first guide roller and a second guide roller disposed in parallel with the first roller and the second roller, respectively; and
a first supporting member and a second supporting member of which one end is connected to one end of the first region and the second region, respectively, and other end is wound around the first guide roller and the second guide roller, respectively.

14. The electronic apparatus of claim 13, wherein a part of the first region is disposed in parallel with the first display between the first roller and the first guide roller, and
wherein a part of the second region is disposed in parallel with the first display between the second roller and the second guide roller.

15. The electronic apparatus of claim 1, further comprising:
a first auxiliary roller, disposed in parallel with the first roller between the first roller and the first display, for guiding a moving path of the first region; and
a second auxiliary roller, disposed in parallel with the second roller between the second roller and the first display, for guiding a moving path of the second region.

* * * * *